US007943700B2

(12) United States Patent
Crowther et al.

(10) Patent No.: US 7,943,700 B2
(45) Date of Patent: May 17, 2011

(54) ENHANCED ESCR OF HDPE RESINS

(75) Inventors: Donna Jean Crowther, Seabrook, TX (US); Stanley J. Katzen, Baton Rouge, LA (US); Zerong Lin, Kingwood, TX (US); Arnold Lustiger, Edison, NJ (US); Jeanne Marie MacDonald, Zachary, LA (US); Thomas T. Sun, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 690 days.

(21) Appl. No.: 11/445,090

(22) Filed: Jun. 1, 2006

(65) Prior Publication Data

US 2007/0282071 A1  Dec. 6, 2007

Related U.S. Application Data

(63) Continuation-in-part of application No. 11/186,185, filed on Jul. 21, 2005, now Pat. No. 7,396,878, which is a continuation-in-part of application No. 10/666,114, filed on Sep. 18, 2003, now Pat. No. 7,022,770.

(60) Provisional application No. 60/424,535, filed on Nov. 7, 2002, provisional application No. 60/414,952, filed on Oct. 1, 2002.

(51) Int. Cl.
*C08L 23/00* (2006.01)
*C08L 23/04* (2006.01)
*C08F 110/02* (2006.01)

(52) U.S. Cl. ...... 525/240; 525/191; 526/352; 526/352.2

(58) Field of Classification Search .................. 525/191, 525/240; 526/352, 352.2
See application file for complete search history.

(56) References Cited

U.S. PATENT DOCUMENTS

| 3,231,550 | A | 1/1966 | Manyik et al. |
| 3,242,099 | A | 3/1966 | Manyik et al. |
| 3,248,179 | A | 4/1966 | Norwood |
| 3,622,521 | A | 11/1971 | Hogan et al. |
| 4,330,639 | A | 5/1982 | Matsuura et al. |
| 4,335,224 | A | 6/1982 | Matsuura et al. |
| 4,336,352 | A | 6/1982 | Sakurai et al. |
| 4,429,079 | A | 1/1984 | Shibata et al. |
| 4,438,238 | A | 3/1984 | Fukushima et al. |
| 4,461,873 | A | 7/1984 | Bailey et al. |
| 4,536,550 | A | 8/1985 | Moriguchi et al. |
| 4,543,399 | A | 9/1985 | Jenkins, III et al. |
| 4,547,551 | A | 10/1985 | Bailey et al. |
| 4,577,768 | A | 3/1986 | Go et al. |
| 4,588,790 | A | 5/1986 | Jenkins, III et al. |
| 4,613,484 | A | 9/1986 | Ayres et al. |
| 4,705,829 | A | 11/1987 | Kwack et al. |
| 4,770,912 | A | 9/1988 | Furrer et al. |
| 4,786,688 | A | 11/1988 | Thiersault et al. |
| 4,792,588 | A | 12/1988 | Suga et al. |
| 4,808,561 | A | 2/1989 | Welborn, Jr. |
| 4,835,219 | A | 5/1989 | Tajima et al. |
| 5,001,205 | A | 3/1991 | Hoel |
| 5,015,511 | A | 5/1991 | Treybig et al. |
| 5,017,714 | A | 5/1991 | Welborn, Jr. |
| 5,028,670 | A | 7/1991 | Chinh et al. |
| 5,055,438 | A | 10/1991 | Canich |
| 5,064,802 | A | 11/1991 | Stevens et al. |
| 5,082,902 | A * | 1/1992 | Gurevitch et al. ............ 525/240 |
| 5,096,867 | A | 3/1992 | Canich |
| 5,124,418 | A | 6/1992 | Welborn, Jr. |
| 5,153,157 | A | 10/1992 | Hlatky et al. |
| 5,189,106 | A | 2/1993 | Morimoto et al. |
| 5,198,401 | A | 3/1993 | Turner et al. |
| 5,240,894 | A | 8/1993 | Burkhardt et al. |
| 5,260,384 | A | 11/1993 | Morimoto et al. |
| 5,264,405 | A | 11/1993 | Canich |
| 5,306,775 | A | 4/1994 | Martin et al. |
| 5,317,036 | A | 5/1994 | Brady, III et al. |
| 5,319,029 | A | 6/1994 | Martin et al. |
| 5,324,800 | A | 6/1994 | Welborn, Jr. et al. |
| 5,346,732 | A | 9/1994 | Lai et al. |
| 5,352,749 | A | 10/1994 | DeChellis et al. |

(Continued)

FOREIGN PATENT DOCUMENTS

AU    1992 1280    9/1999

(Continued)

OTHER PUBLICATIONS

Britovsek, G.J. et al.; "*The Search for New Generation Olefin Plymerization Catalysts; Life Beyond Metallocenes*," Angewandte Chemie, Int. Ed., vol. 38, pp. 428-447, 1999. Britovesk, G. J. et al.; "*Novel olefin polymerization catalysts based on iron and cobalt*," Chem. Commun., pp. 849-850, 1998.
Scollard, J.D., et al.; "*Sterically Demanding Diamide Ligands: Synthesis and Structure of $d^{\circ}$ Zirconium Alkyl Derivatives*," Organometallics, vol. 14, pp. 5478-5480, 1995.
Hlatky G.G., "*Heterogeneous Single-Site Catalysts for Olefin Polymerization*," Chem. Review, vol. 100, pp. 1347-1376, 2000.
Sun, T. et al.; "*Effect of Short Chain Branching on the Coil Dimensions of Polyolefins in Dilute Solution*," Macromolecules, vol. 34, No. 19, pp. 6812-6820, 2001.
Dodge, Philip T., "Rotational Molding," *Encyclopedia of Polymer Science and Engineering*, 1988, vol. 14, pp. 659-670.
Elvers, Barbara, et al., "Injection Molding," *Ullmann's Encyclopedia of Industrial Chemistry*, 1992, vol. A20, pp. 688-696.
Fair, R. L., "Rotational Molding," *Modern Plastics Mid-October Encyclopedia*, 1989, vol. 66, No. 11, pp. 317-318.

*Primary Examiner* — Vasu Jagannathan
*Assistant Examiner* — Irina Krylova

(57) ABSTRACT

Disclosed are polyethylene ("PE") compositions, articles comprising PE compositions, and methods of making blended PE compositions, wherein the blended composition comprises from about 80 to about 95 weight % of a first PE and from about 5 to about 20 weight % of a second PE. The first PE has a density greater than or equal to about 0.945 g/cc and a MWD greater than about 5. The second PE has a density less than about 0.945 g/cc, a melt index less than about 0.70 g/10 minutes and less than or equal to the melt index of the first PE, a MWD ranging from about 1 to about 5, a weight average molecular weight less than about 400,000, and a CDBI greater than about 50%. The PE composition has an ESCR greater than the ESCR of the first PE.

46 Claims, 2 Drawing Sheets

U.S. PATENT DOCUMENTS

| | | | |
|---|---|---|---|
| 5,371,146 A | 12/1994 | Takahashi et al. | |
| 5,380,803 A | 1/1995 | Coutant et al. | |
| 5,382,630 A | 1/1995 | Stehling et al. | |
| 5,382,631 A | 1/1995 | Stehling et al. | |
| 5,405,901 A | 4/1995 | Daniell et al. | |
| 5,405,922 A | 4/1995 | DeChellis et al. | |
| 5,436,304 A | 7/1995 | Griffin et al. | |
| 5,453,471 A | 9/1995 | Bernier et al. | |
| 5,462,999 A | 10/1995 | Griffin et al. | |
| 5,502,124 A | 3/1996 | Crowther et al. | |
| 5,504,049 A | 4/1996 | Crowther et al. | |
| 5,519,091 A | 5/1996 | Tsutsui et al. | |
| 5,530,055 A | 6/1996 | Needham | |
| 5,589,128 A | 12/1996 | Lai et al. | |
| 5,605,969 A | 2/1997 | Tsutsui et al. | |
| 5,616,661 A | 4/1997 | Eisinger et al. | |
| 5,668,228 A | 9/1997 | Chinh et al. | |
| 5,712,352 A | 1/1998 | Brant et al. | |
| 5,851,945 A | 12/1998 | Turner et al. | |
| 5,852,146 A | 12/1998 | Reichie et al. | |
| 5,858,491 A * | 1/1999 | Geussens et al. | 428/36.9 |
| 6,090,893 A | 7/2000 | Harlin et al. | |
| 6,103,775 A * | 8/2000 | Bambara et al. | 521/144 |
| 6,111,023 A | 8/2000 | Chum et al. | |
| 6,136,924 A | 10/2000 | Promel | |
| 6,162,871 A | 12/2000 | Watanabe et al. | |
| 6,180,721 B1 | 1/2001 | Rogestedt et al. | |
| 6,225,421 B1 | 5/2001 | Promel et al. | |
| 6,294,495 B1 | 9/2001 | Matsunaga | |
| 6,362,270 B1 | 3/2002 | Chaudhary et al. | |
| 6,376,410 B1 | 4/2002 | Burkhardt et al. | |
| 6,376,610 B1 * | 4/2002 | Dharmarajan et al. | 525/211 |
| 6,380,122 B1 | 4/2002 | Kuchta et al. | |
| 6,566,450 B2 * | 5/2003 | Debras et al. | 525/191 |
| 6,649,698 B1 * | 11/2003 | Mehta | 525/191 |
| 6,787,608 B2 * | 9/2004 | VanDun et al. | 525/240 |
| 6,806,338 B2 | 10/2004 | Baann et al. | |
| 7,309,741 B2 * | 12/2007 | Kazakov et al. | 525/240 |
| 7,396,878 B2 * | 7/2008 | Lustiger et al. | 525/191 |
| 2002/0143123 A1 * | 10/2002 | Dekmezian et al. | 526/119 |
| 2002/0147285 A1 * | 10/2002 | Debras et al. | 526/106 |
| 2003/0088021 A1 | 5/2003 | Van Dun et al. | |
| 2003/0113496 A1 * | 6/2003 | Harris et al. | 428/36.9 |
| 2003/0187083 A1 | 10/2003 | Harris | |
| 2004/0063861 A1 | 4/2004 | Lustiger et al. | |
| 2004/0192865 A1 * | 9/2004 | Roger et al. | 526/113 |
| 2005/0119413 A1 * | 6/2005 | Maziers | 525/240 |
| 2005/0228139 A1 * | 10/2005 | Lee et al. | 525/191 |
| 2005/0256271 A1 * | 11/2005 | Lustiger et al. | 525/240 |
| 2005/0288443 A1 * | 12/2005 | Mavridis et al. | 525/240 |
| 2007/0128386 A1 * | 6/2007 | Knoerzer et al. | 428/35.2 |

FOREIGN PATENT DOCUMENTS

| | | |
|---|---|---|
| CA | 1268753 | 1/1996 |
| EP | 129 368 | 12/1984 |
| EP | 277 003 | 8/1988 |
| EP | 277 004 | 8/1988 |
| EP | 314 385 | 5/1989 |
| EP | 0 423 962 | 4/1991 |
| EP | 426 637 | 5/1991 |
| EP | 495 375 | 7/1992 |
| EP | 500 944 | 9/1992 |
| EP | 520 732 | 12/1992 |
| EP | 570 982 | 11/1993 |
| EP | 573 403 | 12/1993 |
| EP | 816 384 | 1/1998 |
| EP | 1 201 711 | 5/2002 |
| EP | 1 236 770 | 9/2002 |
| JP | 1997/194537 | 1/1996 |
| JP | 2001-89615 | 5/2001 |
| WO | WO 91/09882 | 7/1991 |
| WO | WO 92/00333 | 1/1992 |
| WO | WO 94/03506 | 2/1994 |
| WO | WO 94/26816 | 11/1994 |
| WO | WO 96/08520 | 3/1996 |
| WO | WO 96/11960 | 4/1996 |
| WO | WO 96/11961 | 4/1996 |
| WO | WO 96/23010 | 8/1996 |
| WO | WO 96/27439 | 9/1996 |
| WO | WO 96/33227 | 10/1996 |
| WO | WO 97/22639 | 6/1997 |
| WO | WO 97/48735 | 12/1997 |
| WO | WO 98/46651 | 10/1998 |
| WO | 00/71615 | 11/2000 |
| WO | 01/96419 | 12/2001 |
| WO | WO 01/98409 | 12/2001 |
| WO | 02/48258 | 6/2002 |
| WO | WO 03/051937 | 6/2003 |
| WO | WO 03/099922 | 12/2003 |
| WO | WO 2004/016688 | 2/2004 |
| WO | 2005/097888 | 10/2005 |

* cited by examiner

ENHANCED ESCR OF HDPE RESINS

The present application is a continuation-in-part of application Ser. No. 11/186,185, filed Jul. 21, 2005, now U.S. Pat. No. 7,396,878, which is a continuation-in-part of application Ser. No. 10/666,114, filed Sep. 18, 2003, now U.S. Pat. No. 7,022,770, which claims priority to Provisional Application No. 60/424,535, filed Nov. 7, 2002, and to Provisional Application No. 60/414,952, filed Oct. 1, 2002.

FIELD OF THE INVENTION

The present invention relates, generally, to polymer blends of higher-density polymer(s) and low levels of lower-density polymer(s), and more particularly to blends of such polymers wherein the higher-density polymer(s) have a melt index greater than or equal to the lower-density polymer(s), and methods of producing the same.

BACKGROUND OF THE INVENTION

High density polyethylene ("HDPE") resins are used in numerous blow molding applications to make products such as household and industrial chemical containers ("HIC"). These resins generally have good rheological properties, but generally poor environmental stress crack resistance ("ESCR"). Accordingly, there is a need to improve the ESCR of certain HDPE, including chromium-catalyzed HDPE. The prior art contains various blends of resins purporting to increase ESCR in polymers, and general methods of selecting the resins which comprise the blends. One such approach is to select resins which have a broad orthogonal composition distribution ("BOCD"). In a BOCD, comonomer is distributed more evenly in the high and low molecular weight fractions of the resin, which is different from the comonomer distribution in resins made from Ziegler-Natta catalysts. For example, such blends of BOCD resins are generally disclosed in U.S. Pat. No. 5,382,630 to Stehling et al., which is fully incorporated herein by reference.

Various publications disclose blending polymers to improve ESCR. For example, WO 2004/016688 to Harris et al. discloses a melt blend of a linear low density polyethylene resin and/or a linear medium density polyethylene resin, and a high density polyethylene resin. The polyethylene composition has a density of about 0.945 to about 0.960 g/cc and a melt flow index of about 0.1 to about 0.4.

U.S. Pub. 2004/0063861 to Lustiger et al. discloses polyethylene compositions having a first polyethylene having a melt index of 0.1 to 3.0 g/10 min, and a density of from 0.905 to 0.938 g/cc; and a second polyethylene having a melt index of 10 to 500 g/10 min and a density of 0.945 to 0.975 g/cc. The composition has a density of from 0.920 to 0.973 g/cc and a melt index of 2 to 200 g/10 min, and the density of the second polyethylene is from 0.037 to 0.062 g/cc greater than the density of the first polyethylene. These compositions purportedly exhibit improved physical properties, such as ESCR, relative to conventional compositions of similar melt index and density.

U.S. Pub. 2003/0088021 to Van Dun et al. discloses blended compositions containing a homopolymer, the use of which allows the incorporation of more comonomer in the additional components of the blend (for the same overall density), resulting in increased tie molecule formation which is said to improve properties such as ESCR, toughness and impact strength.

WO 2003/051937 to Maziers discloses a process for the preparation of polyethylene resins having a multimodal molecular weight distribution that comprises the steps of: (i) providing a first high molecular weight metallocene-produced linear low density polyethylene resin having a density of from 0.920 to 0.940 g/cc, and a high load melt index of from 0.05 to 2 g/10 min; (ii) providing a second high density polyethylene prepared either with a Ziegler-Natta or with a chromium-based catalyst, and polyethylene having a density ranging from 0.950 to 0.970 g/cc, and a high load melt index of from 5 to 100 g/10 min; (iii) physically blending together the first and second polyethylenes to form a polyethylene resin having a semi-high molecular weight, a broad or multimodal molecular weight distribution, a density ranging from 0.948 to 0.958 g/cc and a high load melt index of from 2 to 20 g/10 min. The molecular weight of the metallocene-produced resins is very large and can be typically from 400,000 up to 1,500,000. The high molecular weight metallocene-produced resin will cause the blended composition to have different rheological properties as compared to the base chromium-catalyzed polyethylene. Moreover, the difficulty of dispersing the blended components into each other increases as the molecular weight of each component increases.

In improving ESCR for a blended composition wherein the majority component is a chromium-catalyzed polyethylene, however, the above methods would provide a blended composition having a density much lower than the majority component and/or the rheological properties of the blended composition would be substantially different from that of the majority component. It is important to maintain the density in order to maintain beneficial physical properties such as, for example, stiffness. Accordingly, what is needed is a polymer composition and method of making the same that has improved ESCR over the base chromium-catalyzed polymer without decreasing the density of the blend too far below the density of the base chromium-catalyzed polymer or substantially changing the rheological properties of the base chromium-catalyzed polymer. Additionally, when a metallocene-catalyzed polyethylene is used in the composition, it is desirable that it have a low molecular weight to improve dispersion and to improve the rheological properties of the blend.

Additional references of interest include: "The Search for New-Generation Olefin Polymerization Catalysts; Life Beyond Metallocenes", Angewandte Chemie Int. Ed., Vol. 38, pp. 428-447 (1999), authored by George J. P. Britovsek, et al.; "Novel olefin polymerization catalysts based on iron and cobalt," Chem. Comm., pp. 849-850 (1998), authored by George J. P. Britovsek, et al.; "Sterically Demanding Diamide Ligands: Synthesis and Structure of $d^o$ Zirconium Alkyl Derivatives," Organometallics, Vol. 14, pp. 5478-5480 (1995), authored by D. H. McConville, et al.; "Heterogeneous Single Site Catalysts For Olefin Polymerization", Chem. Review, Vol. 100, pp. 1347-76 (2000), authored by G. G. Hlatky; WO 01/98409; WO 03/051937; WO 97/48735; WO 98/46651; WO 96/33227; WO 96/27439; WO 96/23010; WO 97/22639; WO 96/11961; WO 96/11960; WO 96/08520; U.S. Publication Nos. 2003/0088021 and 2004/0063861; WO 2004/016688; EP 0314385; EP 0816384; U.S. Pat. Nos. 3,231,550; 3,242,099; 3,248,179; 3,622,521; 4,429,079; 4,438,238; 4,461,873; 4,543,399; 4,547,551; 4,588,790; 4,613,484; 4,808,561; 5,001,205; 5,017,714; 5,028,670; 5,055,438; 5,064,802; 5,082,902; 5,124,418; 5,153,157; 5,306,775; 5,317,036; 5,319,029; 5,324,800; 5,352,749; 5,371,146; 5,380,803; 5,382,630; 5,382,631; 5,405,922; 5,436,304; 5,453,471; 5,462,999; 5,502,124; 5,504,049; 5,616,661; 5,668,228; 5,712,352; 5,851,945; 5,852,146; 6,090,893; 6,180,721; 6,376,410; 6,380,122; and JP 1997194537.

SUMMARY OF THE INVENTION

Definitions

As used herein, the term "C-PE" is defined as any polyethylene resin, which is produced using at least one multiple-site, catalyst that contains chromium. Suitable multiple-site, chromium-catalyst compounds and methods of making and using the same are disclosed below herein.

As used herein, the term "SS-PE" is defined as any polyethylene resin, which is produced using a single-site catalyst. Suitable single-site catalysts and methods of making the same are disclosed below herein.

As used herein, the term "M-PE" is defined as any polyethylene resin, which is produced using at least one metallocene catalyst or metallocene-catalyst precursor. Suitable metallocene-catalyst compounds and methods of making and using the same are disclosed below herein. For avoidance of doubt, an M-PE is also an SS-PE.

For the purposes of this application, molecular weight distribution ("MWD") is equivalent to the expression $M_w/M_n$. The expression $M_w/M_n$ is the ratio of the weight average molecular weight ($M_w$) to the number average molecular weight ($M_n$). The weight average molecular weight is given by $$M_w = \frac{\sum_i n_i M_i^2}{\sum_i n_i M_i}$$

where $n_i$ is the number fraction of molecules of molecular weight $M_i$. The number average molecular weight is given by $$M_n = \frac{\sum_i n_i M_i}{\sum_i n_i}$$

where $n_i$ is the number fraction of molecules of molecular weight $M_i$. The Z-average molecular weight is given by $$M_z = \frac{\sum_i n_i M_i^3}{\sum_i n_i M_i^2}$$

where $n_i$ is the number fraction of molecules of molecular weight $M_i$. Measurements of $M_w$, $M_z$, and $M_n$, are typically determined by Gel Permeation Chromatography as disclosed in "Effect of Short Chain Branching on the Coil Dimensions of Polyolefins in Dilute Solution," Macromolecules, Vol. 34, No. 19, pg. 6812 (2001).

For purpose of this invention and the claims thereto, melt index (MI) is determined according to ASTM D-1238 (190° C., 2.16 kg), high load melt index (HLMI) is determined according to ASTM D-1238 (190 ° C., 21.6 kg), density is measured according to ASTM D-1505-03, notched Izod Impact is measured according to ASTM D-256, ESCR is measured according to ASTM D-1693, Condition B using 100% Igepal CO-630. Further, all percentages are by weight unless otherwise noted or indicated by the context.

The present invention provides a polyethylene ("PE") composition. The PE composition comprises from about 80 to about 95 weight % of a first PE having a density greater than or equal to 0.945 g/cc and a molecular weight distribution ("MWD") greater than about 5, and from about 5 to about 20 weight % of a second PE. The second PE has a density less than about 0.945 g/cc, a melt index less than about 0.70 g/10 minutes and less than or equal to the melt index of the first PE, a MWD ranging from about 1 to about 5, a weight average molecular weight less than about 400,000, and a CDBI greater than about 50%. The PE composition has an ESCR greater than the ESCR of the first PE.

In some embodiments of the present invention, the first PE is a co-polymer. In further embodiments, the density of the PE composition is within about 0.008 g/cc, optionally about 0.005 g/cc, optionally about 0.003 g/cc, and optionally about 0.002 g/cc, of the density of the first PE. In some embodiments, the PE composition comprises from about 85 to about 95 weight % of the first PE and from about 5 to about 15 weight % of the second PE, and optionally from about 85 to about 92 weight % of the first PE and from about 8 to about 15 weight % of the second PE.

In some embodiments of the present invention, the first PE has a density ranging from about 0.945 to about 0.970 g/cc, optionally from about 0.950 to about 0.965 g/cc, and optionally from about 0.955 to about 0.960 g/cc. In further embodiments, the first PE has a melt index ranging from about 0.05 to about 0.70 g/10 minutes, optionally from about 0.05 to about 0.5 g/10 minutes, and optionally less than about 0.30 g/10 minutes. In still further embodiments, the first PE has a molecular weight distribution ranging from about 5 to about 40, optionally from about 10 to about 40, and optionally from about 15 to about 30. In some embodiments, the first PE is a C-PE.

In some embodiments of the present invention, the second PE has a density ranging from about 0.900 to about 0.940 g/cc, optionally from about 0.916 to about 0.940 g/cc, optionally from about 0.900 to about 0.935 g/cc, and optionally from about 0.900 to about 0.930 g/cc. In further embodiments, the second PE has a molecular weight distribution ranging from about 1.5 to about 5, optionally from about 2 to about 4, and optionally from about 2 to about 3. In still further embodiments, the second PE has a weight average molecular weight less than about 375,000, optionally less than about 350,000, and optionally from about 100,000 to about 300,000. In additional embodiments, the second PE has a high load melt index from about 0.1 to about 10 g/10 minutes, optionally from about 0.5 to about 7 g/10 minutes, and optionally from about 1 to about 5.5 g/10 minutes. In some embodiments, the second PE is LLDPE. In further embodiments, the second PE is a SS-PE, and optionally the second PE is a M-PE.

In some embodiments of the present invention, the measured ESCR value for the PE composition is greater than or equal to a value determined by the expression $X(0.0271)(D^{(-147.58)})$, wherein X is greater than or equal to 2 and D is the density of the PE composition. Optionally, X may be greater than or equal to 3 or greater than or equal to 4. In further embodiments, the PE composition has a density ranging from about 0.945 to about 0.960 g/cc, optionally from about 0.948 to about 0.957 g/cc, optionally from about 0.950 to about 0.960 g/cc, and optionally from about 0.955 to about 0.960 g/cc.

In some embodiments, the PE composition has an Izod Impact at least about 35% greater than the Izod impact of the first PE, optionally from about 35% to about 400% greater than the Izod impact of the first PE, and optionally from about 35% to about 200% greater than the Izod impact of the first PE. In further embodiments, the PE composition has an Izod Impact ranging from about 50% to about 400% greater than the Izod impact of the first PE, and optionally from about 50% to about 200% greater than the Izod impact of the first PE.

In further embodiments, the PE composition has a high load melt index from about 5 to about 50 g/10 minutes, optionally from about 10 to about 40 g/10 minutes, and optionally from about 15 to about 30 g/10 minutes. In some embodiments herein, the PE composition has a high load melt index within about 7 g/10 minutes, optionally about 5 g/10 minutes, and optionally about 3 g/10 minutes, of the high load melt index of the first PE.

In another embodiment, the present invention provides a pseudo-BOCD (as defined below) polyethylene composition. The composition comprises a first PE having a MWD greater than about 5 and a first comonomer, and a second PE having a MWD from about 1 to about 5 and a second comonomer. Below the $M_z$ of the composition, the second PE has a higher mole % (preferably 90% or more) of the second comonomer than the first PE has of the first comonomer, and above the $M_z$ of the composition, the composition comprises at least about 90% of the first PE.

In another embodiment, the present invention provides a pseudo-BOCD (as defined below) polyethylene composition which comprises about 80 to about 95 weight % of a first PE, wherein the first PE has a MWD greater than about 5 and a density greater than or equal to about 0.945 g/cc, and about 5 to about 20 weight % of a second PE. The second PE has a MWD ranging from about 1 to about 5, the density of the second PE is less than about 0.945 g/cc, and the melt index of the second PE is less than about 0.70 g/10 minutes. Alternately, the melt index of the second PE is less than or equal to the melt index of the first PE; alternately, the melt index of the second PE is within 3 dg/min of the melt index of the first PE, alternately, within 2 dg/min, alternately, within 1 dg/min, or alternately, within 0.5 dg/min. In an alternate embodiment, the HLMI of the second PE is less than or equal to the HLMI of the first PE; alternately, the HLMI of the second PE is within 50 dg/min of the HLMI of the first PE, alternately, within 45 dg/min, alternately, within 40 dg/min, or alternately, within 35 dg/min. In another embodiment, that portion of the composition that is above the $M_z$ of the composition, comprises at least about 90%, optionally about 92%, optionally about 95%, optionally about 97%, and optionally about 98% of the first PE. Alternately, the compositions of this invention have an ESCR of 40 hours or more, alternately, 50 hours or more, alternately, 75 hours or more, alternately, 100 hours or more, alternately, 200 hours or more, alternately 300, hours or more, alternately, 400 hours or more, alternately, 500 hours or more, alternately, 600 hours or more, alternately, 700 hours or more, alternately, 800 hours or more, alternately, 900 hours or more, or alternately, 1000 hours or more.

In another embodiment, the present invention provides blow-molded articles having a PE composition. The composition comprises from about 80 to about 95 weight % of a first PE having a density greater than or equal to about 0.945 g/cc and a MWD greater than about 5, and from about 5 to about 20 weight % of a second PE. The second PE has a density less than about 0.945 g/cc, a melt index less than about 0.70 g/10 minutes and less than or equal to the melt index of the first PE, a MWD ranging from about 1 to about 5, and a weight average molecular weight less than about 400,000. The PE composition has an ESCR greater than the ESCR of the first PE. In another embodiment the first PE has an ESCR of 6 hours or more, alternately 15 hours or more, alternately 30 hours or more, or alternately 40 hours or more.

In another embodiment, the present invention provides a method for making PE compositions. The method comprises blending from about 80 to about 95 weight % of a first PE having a density greater than or equal to about 0.945 g/cc and a MWD greater than about 5 with from about 5 to about 20 weight % of a second PE. The second PE has a density less than about 0.945 g/cc, a melt index less than about 0.70 g/10 minutes and less than or equal to the melt index of the first PE, a MWD ranging from about 1 to about 5, and a weight average molecular weight less than about 400,000. The PE composition has an ESCR greater than the ESCR of the first PE.

DETAILED DESCRIPTION OF THE INVENTION

Figure 1:
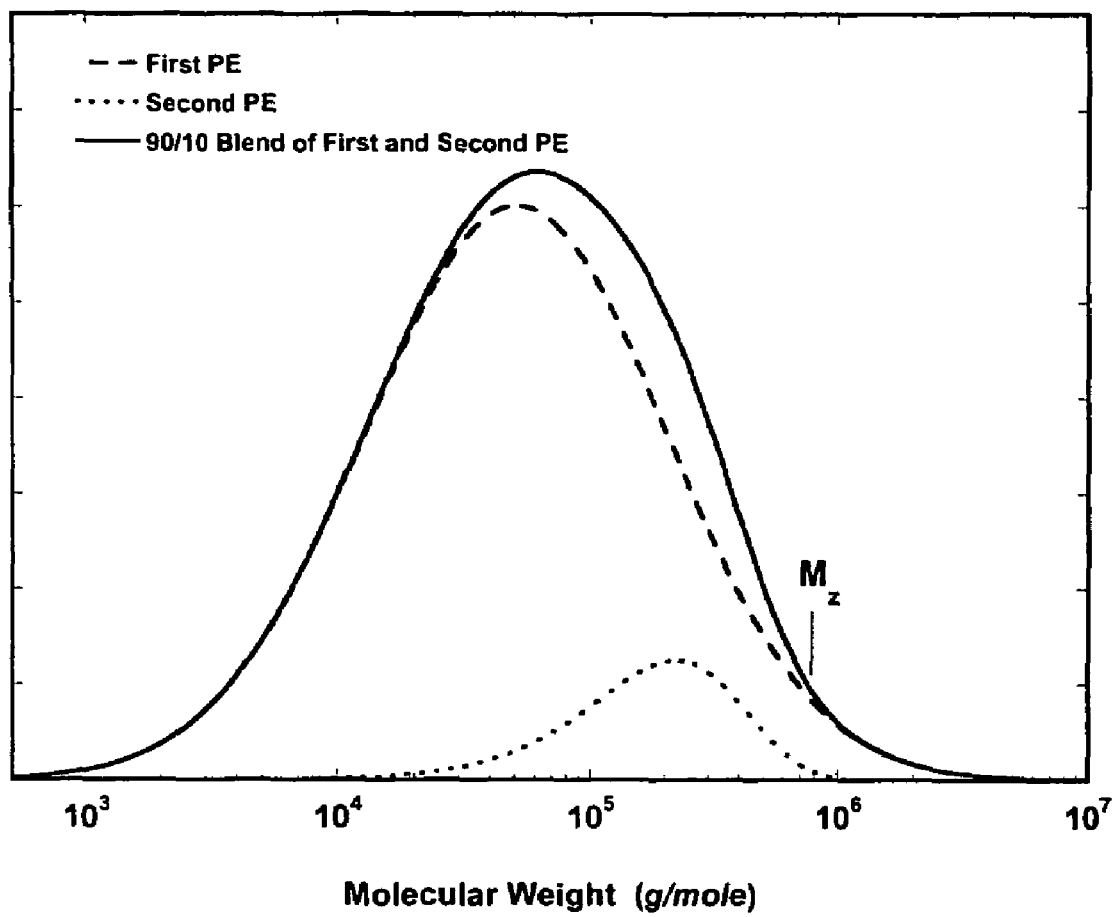
FIG. 1 is an illustration of pseudo-BOCD characteristics for blends of the invention.
Figure 2:
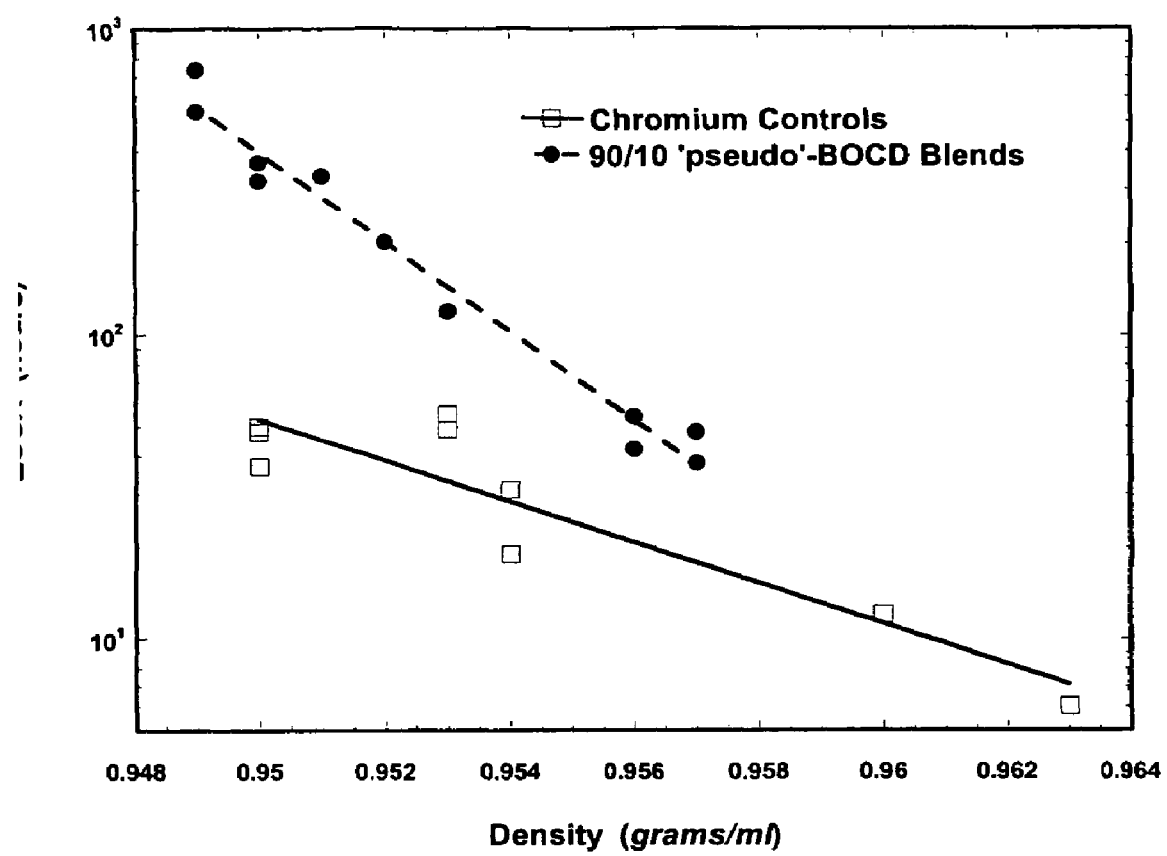
FIG. 2 illustrates a plot of the chromium control samples' ESCR values at their respective densities, as well as a plot of the blended components' ESCR values at their respective densities.

While the making and using of various embodiments of the present invention are discussed in detail below, it should be appreciated that the present invention provides many applicable inventive concepts, which can be embodied in a wide variety of specific contexts. The specific embodiments and figures discussed herein are merely illustrative and are not intended to limit the scope of the invention.

First Polyethylene

The first PE has a density greater than or equal to about 0.945 g/cc. In one embodiment, the first PE has a density ranging from about 0.945 g/cc to about 0.970 g/cc. In an alternative embodiment, the first PE has a density ranging from about 0.950 g/cc to about 0.965 g/cc. In a still further embodiment, the first PE has a density ranging from about 0.955 g/cc to about 0.960 g/cc.

The first PE has a MWD greater than about 5. In one embodiment, the first PE has a MWD from about 5 to about 40. In another embodiment, the first PE has a MWD from about 10 to about 35. In a still further embodiment, the first PE has a MWD from about 15 to about 30.

The first PE typically has a melt index ("MI") ranging from about 0.05 g/10 minutes to about 0.70 g/10 minutes. In one embodiment, the first PE has a melt index ranging from about 0.05 g/10 minutes to about 0.50 g/10 minutes. In another embodiment, the first PE has a melt index ranging from about 0.1 g/10 minutes to about 0.50 g/10 minutes. In a still further embodiment, the first PE has a melt index ranging from about 0.05 g/10 minutes to about 0.40 g/10 minutes.

The first PE typically has an ESCR ranging from about 5 hours to about 100 hours. In one embodiment, the first PE has an ESCR ranging from about 10 hours to about 50 hours. In another embodiment, the first PE has an ESCR ranging from about 15 hours to about 40 hours. In a still further embodiment, the first PE has an ESCR ranging from about 15 hours to about 20 hours.

In another embodiment, the first-PE is a copolymer and has a CDBI of less than 50%, alternately, less than about 45%. In another embodiment, the first PE is a homoplymer.

In another embodiment, the first PE useful in this invention has a notched Izod impact of 1 ft lbs/in or more, alternately, 2 ft lbs/in or more, and, alternately, 3 ft lbs/in or more.

The first PE may be a C-PE. Conventional multiple-site, chromium-catalyst compounds, often referred to as Phillips-type catalysts, suitable for use to prepare the first PE include, for example, chromium (VI) oxide ($CrO_3$), chromocene, silyl chromate, chromyl chloride ($CrO_2Cl_2$), chromium-2-ethylhexanoate, chromium acetylacetonate (Cr(AcAc)$_3$), and the like. Non-limiting examples are disclosed in U.S. Pat. Nos. 3,242,099 and 3,231,550 and EP 0 314 385A, which are fully incorporated herein by reference.

EP 0 314 385A discloses the preparation of titanated chromium on silica catalysts useful for gas phase polymerization of ethylene to prepare first PE's useful herein. The catalyst is combined with at least one magnesium compound, RMgR', wherein R and R' are the same or different and are $C_1$ to $C_{12}$ hydrocarbyl groups, either prior to feeding or within the polymerization vessel, to provide a molar ratio of magnesium to chromium in the catalyst composition in excess of 1.25:1 to 25:1. The catalyst may be titanated using any of a number of titanium halides, alkyl titanium halides, alkyl titanium alkoxides, alkoxy titanium halides, or titanium alkoxides.

The preparation of multiple-site, chromium catalysts useful to prepare first PE's is described in the following paragraphs. One of ordinary skill in the art, however, will recognize that other methods may also be suitable for preparing these catalysts, and such alternate methods are within the intended scope and spirit of the inventions described herein.

Chromium-Supported Catalyst System

The terms "support" or "carrier" are used interchangeably and include any porous or non-porous support material, preferably a porous support material, such as, for example, talc, inorganic oxides and inorganic chlorides, or any other inorganic support material and the like, or mixtures thereof.

A preferred group of carriers include inorganic oxides of Group 2, 3, 4, 5, 13, or 14 metals. Preferred supports include silica, alumina, silica-alumina, magnesium chloride, or mixtures thereof. Other useful supports include magnesia, titania, zirconia, and the like. Also, combinations of these support materials may be used, such as, for example, silica-chromium and silica-titania.

In one embodiment, the carrier, preferably an inorganic oxide, has a surface area in the range of from about 10 to about 700 m$^2$/g, from about 50 to about 600 m$^2$/g, or from about 100 to about 400 m$^2$/g. In another embodiment, the carrier, preferably an inorganic oxide, has a total pore volume in the range of from about 0.1 to about 4.0 cc/g, preferably from about 0.5 to about 3.5 cc/g, and even more preferably from about 0.8 to about 3.0 cc/g. In an alternative embodiment, the carrier, preferably an inorganic oxide, has an average particle size in the range of from about 10 to about 500 µm, preferably from about 20 to about 200 µm, and even more preferably from about 20 to about 150 µm. In yet another embodiment, the carrier has an average pore size of from about 10 Å to about 1000 Å, preferably from about 50 Å to about 500 Å, and more preferably from about 75 Å to about 350 Å.

The support is impregnated with chromium, preferably chromium oxide or chromium acetate. In some embodiments, the support is chromium-impregnated silica. In one embodiment, the support comprises from about 0.1 wt % to about 2 wt % chromium, preferably from about 0.25 to about 1.5 wt % chromium, more preferably from about 0.5 to about 1.0 wt % chromium, as determined by elemental analysis by X-ray photoelectron spectroscopy (XPS), normalizing to hydrogen and metals. In a further embodiment, the chromium impregnated silica is HA30W, which can be procured from W.R. Grace & Co-Conn. (Colombia, Md.). HA30W has a pore volume of about 1.5 cc/g, a surface area of about 340 to about 420 m$^2$/g, and contains about 1 percent chromium. In an alternative embodiment, the chromium impregnated silica is C-25300, which can be procured from PQ Corporation, Conshohocken, Pa. C-25300 has a pore volume of about 2.2 cc/g, a surface area of about 460 to about 520 m$^2$/g, and contains about 1 percent chromium. Other acceptable commercially available support products include, inter alia, 969MPI, HA30, HE-3, HA30LF, and 969MSB, all of which can be procured from W.R. Grace & Co-Conn. (Colombia, Md.). Additionally, EP30XA and EP30X, procured from INEOS Silicas Americas LLC Warrington, England (formerly Crosfield Catalysts Ltd.), may be used as the support. EP30XA contains about 0.25 percent chromium. Specific methods for impregnating a support with a Group 6 metal or metal compound are disclosed in U.S. Pat. No. 3,622,521, which is fully incorporated herein by reference.

Activation

In one embodiment, the catalyst is heated by fluidizing the catalyst in dry air while heating to a pre-determined temperature. The activated catalyst can be recovered as a free-flowing powder. In an alternative embodiment, the catalyst may be activated with a sequence of gaseous compositions. For example, the catalyst could be first heated in nitrogen to a certain temperature followed by air at a second temperature, then cooled under nitrogen to ambient temperature. At the end of activation, the catalyst could be cooled to ambient temperature and stored under nitrogen for use in a polymerization reactor.

These activated catalyst systems are then used to polymerize ethylene and, optional, comonomers such as $C_3$ to $C_{12}$ alpha olefins, such as propylene, butene, hexene, octene, decene) to make high density PE's.

Second Polyethylene

The second PE has a density less than about 0.945 g/cc. In one embodiment, the second PE has a density ranging from about 0.900 g/cc to about 0.940 g/cc. In a further embodiment, the second PE has a density ranging from about 0.916 to about 0.940 g/cc. In an alternative embodiment, the second PE has a density ranging from about 0.900 g/cc to about 0.935 g/cc. In a still further embodiment, the second PE has a density ranging from about 0.900 g/cc to about 0.930 g/cc.

In some embodiments, the second PE is a linear low density polyethylene ("LLDPE"). LLDPE has a density generally ranging from about 0.915 to about 0.940 g/cc, and has generally linear branching.

In one embodiment, the second PE has a composition distribution breadth index ("CDBI") greater than 50%. The CDBI is defined as the weight percent of the copolymer molecules having a comonomer content within 50 percent of the median total molar comonomer content, ignoring fractions with $M_w$ less than 20,000. The CDBI of linear PE not containing a comonomer is defined as 100%. The CDBI of a copolymer is readily calculated using techniques known in the art. The technique used herein is temperature rising elution fractionation ("TREF") as described in, for example, U.S. Pat. No. 5,382,630. Alternately, the second PE has a CDBI of 60% or more, alternately, 70% or more, alternately, 80% or more, or alternately, 90% or more. In an alternate embodiment the second-PE has a CDBI of from 60 to 80%.

The second PE has a MWD from about 1 to about 5. In one embodiment, the second PE has a MWD from about 1.5 to about 5. In another embodiment, the second PE has a MWD from about 2 to about 4. In a still further embodiment, the second PE has a MWD from about 2 to about 3.

The second PE generally has a high load melt index (denoted "HLMI" or "$I_{21}$") ranging from about 0.1 g/10 minutes to about 10 g/10 minutes. In one embodiment, the second PE has a high load melt index ranging from about 0.5 g/10 minutes to about 7 g/10 minutes, preferably from about 1 g/10 minutes to about 5.5 g/10 minutes. In a further embodiment, the second PE has a high load melt index ranging from about 1.5 g/10 minutes to about 7 g/10 minutes, preferably from about 1.5 g/10 minutes to about 5 g/10 minutes. In another embodiment, the second PE has a high load melt index ranging from about 2 g/10 minutes to about 7 g/10 minutes, preferably from about 2 g/10 minutes to about 5 g/10 minutes. In an alternative embodiment, the second PE has a high load melt index ranging from about 2.5 g/10 minutes to about 7 g/10 minutes.

The second PE typically has a weight average molecular weight less than about 400,000. In one embodiment, the second PE has a weight average molecular weight less than about 375,000. In another embodiment, the second PE has a weight average molecular weight less than about 350,000. In a still further embodiment, the second PE has a weight average molecular weight ranging from about 100,000 to about 300,000.

In an alternate embodiment, the second PE is an ethylene-based plastomer. Useful ethylene-based plastomers are typically a homopolymer of ethylene or a copolymer comprising at least 50 wt % ethylene, and having up to 50 wt %, preferably 1 to 35 weight %, even more preferably 1 to 6 weight % of a C3-C20 comonomer, based upon the weight of the copolymer. The polyethylene copolymers preferably have a composition distribution breadth index (CDBI) of 90% or more, even more preferably above 95%. In another preferred embodiment the ethylene copolymer has a density of 0.86 to 0.925 g/cm$^3$ and a CDBI of 90% or more, preferably between 95% and 99%.

In an embodiment, the ethylene-based plastomers described above are metallocene polyethylenes (mPE's). The mPE homopolymers or copolymers may be produced using mono- or bis-cyclopentadienyl transition metal catalysts in combination with an activator of alumoxane and/or a non-coordinating anion in solution, slurry, high pressure, or gas phase. The catalyst and activator may be supported or unsupported and the cyclopentadienyl rings may be substituted or unsubstituted. For more information on the methods and catalysts/activators to produce such mPE homopolymers and copolymers see WO 94/26816; WO 94/03506; EPA 277,003; EPA 277,004; U.S. Pat. Nos. 5,153,157; 5,198,401; 5,240,894; 5,017,714; CA 1,268,753; U.S. Pat. No. 5,324,800; EPA 129,368; U.S. Pat. No. 5,264,405; EPA 520,732; WO 92 00333; U.S. Pat. No. 5,096,867; EPA 426 637; EPA 573 403; EPA 520 732; EPA 495 375; EPA 500 944; EPA 570 982; WO91/09882; WO94/03506 and U.S. Pat. No. 5,055,438.

In an alternate embodiment, the second PE is a mPE having a CDBI of 60 to 80, preferably 65 to 80, and a density of 0.910 to 0.95 g/cc, alternately 0.915 to 0.94 g/cc, or alternately 0.920 to 0.935 g/cc. Such copolymers are available under the trade name EXCEED from ExxonMobil Chemical Company in Houston, Tex.

The second PE may be a SS-PE. Suitable single-site catalysts include, for example, metal imido complexes, metallocene complexes, and other single-site catalysts, as explained more fully below.

Exemplary compounds of bis-amide based catalysts include those described in the patent literature. For example, international patent publications WO 96/23010, WO 97/48735, and "Novel olefin polymerization catalysts based on iron and cobalt," Chem. Comm., pp. 849-850 (1998), authored by George J. P. Britovsek, et al.; disclose diimine-based ligands for Group 8-10-compounds that undergo ionic activation and polymerize olefins. Examples of suitable polymerization catalyst systems from Group 5-10 metals, in which the active center is highly oxidized and stabilized by low, coordination-number polyanionic ligand systems, are described in U.S. Pat. No. 5,502,124 and its divisional U.S. Pat. No. 5,504,049. Further suitable examples include the Group 5 organometallic catalyst compounds of U.S. Pat. No. 5,851,945 and the tridentate, ligand-containing Group 5-10 organometallic catalysts of U.S. Pat. No. 6,294,495.

Other useful catalyst compounds are those Group 5 and 6 metal imido complexes described in EP-A2-0 816 384 and U.S. Pat. No. 5,851,945, which is fully incorporated herein by reference. In addition, single-site catalysts include bridged bis(arylamido) Group 4 compounds described by D. H. McConville et al., "Sterically Demanding Diamide Ligands: Synthesis and Structure of d$^o$ Zirconium Alkyl Derivatives," Organometallics, Vol. 14, pp. 5478-5480 (1995), authored by D. H. McConville, et al.; which is fully incorporated herein by reference. In addition, bridged bis(amido) catalyst compounds are described in WO 96/27439, which is fully incorporated herein by reference. Other useful catalysts are described as bis(hydroxy aromatic nitrogen ligands) in U.S. Pat. No. 5,852,146, which is fully incorporated herein by reference. Other useful catalysts containing one or more Group 15 atoms include those described in WO 98/46651, which is fully incorporated herein by reference.

The literature describes many additional suitable catalyst compounds and methods of supporting the same. Compounds that contain abstractable ligands or that can be alkylated to contain abstractable ligands can be used to produce the second-PE. See, for instance, "The Search for New-Generation Olefin Polymerization Catalysts; Life Beyond Metallocenes," Angewandte Chemie Int. Ed., Vol. 38, pp. 428-447 (1999), authored by George J. P. Britovsek, et al.; which is fully incorporated herein by reference. Suitable single-site Group 3 metal-containing catalysts and still further single-site catalysts, as well as methods of supporting the same are disclosed in "Heterogeneous Single Site Catalysts For Olefin Polymerization", Chem. Review, Vol. 100, pp. 1347-76 (2000), authored by G. G. Hlatky; which is fully incorporated herein by reference.

As used herein, the term "metallocene catalyst" is defined to be at least one transition metal compound containing one or more substituted or unsubstituted cyclopentadienyl moiety (Cp) (typically two Cp moieties) in combination with a Group 4, 5, or 6 transition metal (M). A metallocene catalyst is considered a single-site catalyst.

Metallocene catalysts generally require activation with a suitable co-catalyst, or activator, in order to yield an "active metallocene catalyst", i.e., an organometallic complex with a vacant coordination site that can coordinate, insert, and polymerize olefins. Active catalyst systems generally include not only the metallocene complex, but also an activator, such as an alumoxane or a derivative thereof (preferably methyl alumoxane), an ionizing activator, a Lewis acid, or a combination thereof. Alkylalumoxanes (typically methyl alumoxane and modified methylalumoxanes) are particularly suitable as catalyst activators. The catalyst system may be supported on a carrier, typically an inorganic oxide or chloride or a resinous material such as, for example, polyethylene or silica.

The prior art is replete with examples of metallocene catalysts/systems for producing polyethylene. Useful metallocene compounds include bridged and unbridged biscyclopentadienyl zirconium compounds (in particular where the Cp rings are substituted or unsubstituted indenyl or fluorenyl groups). Non-limiting examples of metallocene catalysts and catalyst systems useful in practicing the present invention include those described in, inter alia, WO 96/11961 and WO 96/11960, and in U.S. Pat. Nos. 4,808,561; 5,017,714; 5,055, 438; 5,064,802; 5,124,418; 5,153,157 and 5,324,800. More recent examples include the catalysts and systems described in U.S. Pat. Nos. 6,380,122 and 6,376,410, WO01/98409, and all of which are fully incorporated herein by reference.

Polymerization of First PE and Second PE

The first PE and the second PE of the present invention may be polymerized in a solution, bulk, gas, or slurry polymerization process or any combination thereof using the catalysts and activators described above. One or more reactors in sequence, series, or parallel may be used. Gas phase polymerization is disclosed generally in, inter alia, U.S. Pat. Nos. 4,543,399; 4,588,790; 5,028,670; 5,317,036; 5,352,749; 5,405,922; 5,436,304; 5,453,471; 5,462,999; 5,616,661; and 5,668,228, all of which are fully incorporated herein by reference. Slurry polymerization processes are generally described in, inter alia, U.S. Pat. Nos. 3,248,179 and 4,613, 484 and PCT publication WO 96/08520, all of which are fully incorporated herein by reference. Homogeneous, bulk, or solution phase polymerization processes are generally disclosed in, for example, U.S. Pat. No. 5,001,205 and international applications WO 96/33227 and WO 97/22639, all of which are fully incorporated herein by reference.

Blend Compositions

Blended compositions of the present invention comprise a first PE and a second PE. The first PE is the majority component and the second PE is the minority component, relative to one another (by majority component is meant that the component is present at 50 weight % or more, based upon the weight of the blend). In one embodiment, the blended composition contains about 80 to about 95 weight percent first PE based on the weight of the first PE and second PE. In another embodiment, the blended composition contains about 85 to about 95 weight percent of the first PE based on the weight of the first PE and second PE. In a still further embodiment, the blended composition contains about 90 to about 95 weight percent of the first PE based on the weight of the first PE and second PE. Alternately, the compositions of this invention comprise 50 to 95 weight % of the first PE and from 5 to 50 weight % of the second PE, based upon the weight of the blend. Alternately, the compositions of this invention comprise 75 to 90 weight % of the first PE and from 10 to 25 weight % of the second PE, based upon the weight of the blend.

In one embodiment, the blended composition contains about 5 to about 20 weight percent of the second PE based on the weight of the first PE and second PE. In another embodiment, the blended composition contains about 5 to about 15 weight percent of the second PE based on the weight of the first PE and second PE. In a still further embodiment, the blended composition contains about 5 to about 10 weight percent of the second PE based on the weight of the first PE and second PE.

FIG. 1 represents an embodiment of the present invention, in which the blended compositions have pseudo-BOCD characteristics. A blended composition is defined as having pseudo-BOCD characteristics when the low and middle molecular weight portions of the blended composition have BOCD characteristics, but the upper molecular weight portion of the blend composition does not have BOCD characteristics. Without wishing to be bound by the theory, it is believed that the blended compositions of the present invention have pseudo-BOCD characteristics because the second PE's molecular weight distribution is narrow relative to the first PE, and the blend contains a relatively low weight percent of the second PE compared to the weight percent of the first PE. Thus, when pseudo-BOCD characteristics exist, the low and middle molecular weight portions of the blended composition have comonomer more heavily distributed in the second PE, and the high molecular weight portion of the blended composition has a majority of the first PE—the component having less comonomer. Pseudo-BOCD is quantified by reviewing the molecular weight distribution curve generated using the data generated by the CDBI method above. As used herein, the upper region of the molecular weight distribution curve is defined as that portion of the curve above the $M_z$ of the blend. The lower and middle regions of the molecular weight distribution curve are defined as those portions of the curve below the $M_z$ of the blend. In a composition having pseudo-BOCD characteristics, the portion of the molecular weight distribution curve below the $M_z$ value has BOCD characteristics, i.e., the comonomer is more heavily distributed in the second PE, while the portion of the molecular weight distribution curve above the $M_z$ value has non-BOCD characteristics. In the pseudo-BOCD compositions described herein, the polymer composition above the $M_z$ value comprises at least 90% of the first PE. In alternative embodiments, the polymer composition above the $M_z$ comprises at least 91%, 92%, 93%, 94%, 95%, 96%, 97%, 98%, or 99% of the first PE.

The first PE and the second PE of the present invention may be blended in any manner sufficient to achieve an adequate dispersion of one component into the other. Various methods of blending include, but are not limited to, static mixing, batch mixing, extrusion, and combinations thereof. The first PE and the second PE may be dry blended in a tumbler or other container. In an alternative embodiment, the first PE and the second PE may be blended using a master batch. In another embodiment, the first PE and the second PE may be dispersed as part of a processing method used to fabricate articles, such as in an extruder (single or twin screw), optionally on a blow molding line.

In yet another embodiment, the first PE and the second PE may be blended by melt pressing. In this embodiment, a suitable press, for example, a Carver press, melt presses the first PE and second PE to a thickness ranging from about 0.25 millimeters to about 1.5 millimeters, preferably from about 0.25 to about 0.5 millimeters. The temperature of the melt press ranges from about 100° C. to about 250° C., preferably from about 150° C. to about 200° C. The pressed first PE and second PE are rolled and folded and are melt pressed again. This process is repeated from 2 to 20 times. In a still further embodiment, internal mixers may be used in connection with solution and melt blending.

In yet another embodiment, the first PE and second PE may be blended in a Brabender Plastograph, at a temperature of about 180° C. to about 200° C., for about 1 to about 20 minutes. A still further embodiment comprises blending the polymers in a Banbury internal mixer above the flux temperature of all of the components, e.g., at 180° C. for about 5 minutes. In yet another embodiment, the first PE and second PE are continually mixed.

The above-noted processes and descriptions are intended to include the use of single and twin screw mixing extruders, static mixers for mixing molten polymer streams of low viscosity, impingement mixers, as well as other machines and processes designed to disperse a low density component and a high density component in intimate contact.

In one embodiment, the first PE and second PE may be blended using an extruder. In this embodiment, the first PE and second PE are first dry blended with an appropriate additive package (including components such as antioxidants) in a tumble blender to achieve a homogeneous mixing of components at the desired composition. Then, the first PE and second PE are compounded and pelletized using, for example, a ZSK-57 twin screw extruder at an appropriate extrusion temperature.

The blended compositions of the present invention have a density greater than about 0.945 g/cc. In one embodiment, the blended composition has a density ranging from about 0.945 g/cc to about 0.960 g/cc. In an alternative embodiment, the blended composition has a density ranging from about 0.948 g/cc to about 0.957 g/cc. In a still further embodiment, the blended composition has a density ranging from about 0.950 g/cc to about 0.960 g/cc. In another embodiment, the blended composition has a density ranging from about 0.955 g/cc to about 0.960 g/cc.

Further, the blended composition generally has a density within about 0.008 g/cc of the density of the first PE contained within the blend. In one embodiment, the blended composition has a density within about 0.005 g/cc of the density of the first PE contained within the blend. In a further embodiment, the blended composition has a density within about 0.003 g/cc of the density of the first PE contained within the blend. In an alternative embodiment, the blended composition has a density within about 0.002 g/cc of the density of the first PE contained within the blend.

The blended composition, alternately, has a high load melt index ranging from about 5 to about 50 g/10 minutes. In one embodiment, the blended composition has a high load melt index ranging from about 10 to about 40 g/10 minutes. In another embodiment, the blended composition has a high load melt index ranging from about 15 to about 30 g/10 minutes.

The blended composition typically has a notched Izod Impact about 35% greater than the Izod Impact of the first PE contained in the blended composition. In one embodiment, the blended composition has an Izod Impact ranging from about 35% to about 400% greater than the Izod Impact of the first PE contained in the blended composition. In another embodiment, the blended composition has a notched Izod Impact ranging from about 35% to about 200% greater than the notched Izod Impact of the first PE contained in the blended composition. In a still further embodiment, the blended composition has a notched Izod Impact ranging from about 50% to about 400% greater than the notched Izod Impact of the first PE contained in the blended composition. In an alternative embodiment, the blended composition has a notched Izod Impact ranging from about 50% to about 200% greater than the notched Izod Impact of the first PE contained in the blended composition. In another embodiment, the blends of this invention have a notched Izod impact of 2 ft lbs/in or more, alternately, 3 ft lbs/in or more, 4 ft lbs/in or more, alternately 5 ft lbs/in or more, 6 ft lbs/in or more, alternately, 7 ft lbs/in or more, alternately 8 ft lbs/in or more, or alternately, 10 ft lbs/in or more.

The blended composition generally has an ESCR greater than the ESCR of the first PE contained in the blend. In some embodiments, compositions of the present invention are described by equation (a):

$$E_{comp} \geq X(0.0271)(D_{comp}^{(-147.58)}), \quad (a)$$

wherein X is greater than or equal to 2, $D_{comp}$ is the density of the blended composition, and $E_{comp}$ is the measured ESCR of the blended composition. In further embodiments, X is greater than or equal to 3. In still further embodiments, X is greater than or equal to 4.

In another embodiment, this invention relates to:
1. A polyethylene (PE) composition comprising:
    (a) from about 80 to about 95 weight % (based upon the weight of the blend) of a first PE having a density greater than or equal to 0.945 g/cc and a MWD greater than about 5; and
    (b) from about 5 to about 20 weight % (based upon the weight of the blend) of a second PE, having:
        (i) a density less than 0.945 g/cc,
        (ii) a melt index less than about 0.70 g/10 minutes and less than or equal to the melt index of the first PE of step (a),
        (iii) a MWD ranging from about 1 to about 5,
        (iv) a weight average molecular weight less than about 400,000, and
        (v) a CDBI greater than about 50%;
    wherein the PE composition has an ESCR greater than the ESCR of the first PE.
2. The PE composition of paragraph 1, wherein the first PE is a co-polymer.
3. The PE composition of paragraph 1 or 2, wherein the density of the PE composition is within about 0.008 g/cc of the density of the first PE.
4. The PE composition of any of paragraphs 1 to 3, wherein the density of the PE composition is within about 0.005 g/cc of the density of the first PE.
5. The PE composition of any of paragraphs 1 to 4, wherein the density of the PE composition is within about 0.003 g/cc of the density of the first PE.
6. The PE composition of any of paragraphs 1 to 5, wherein the density of the PE composition is within about 0.002 g/cc of the density of the first PE.
7. The PE composition of any of paragraphs 1 to 6, wherein the composition comprises from about 85 to about 95 weight % of the first PE and from about 5 to about 15 weight % of the second PE.
8. The PE composition of any of paragraphs 1 to 7, wherein the composition comprises from about 85 to about 92 weight % of the first PE and from about 8 to about 15 weight % of the second PE.
9. The PE composition of any of paragraphs 1 to 8, wherein the first PE has a density ranging from about 0.945 to about 0.970 g/cc.
10. The PE composition of any of paragraphs 1 to 9, wherein the first PE has a density ranging from about 0.950 to about 0.965 g/cc.
11. The PE composition of any of paragraphs 1 to 10, wherein the first PE has a density ranging from about 0.955 to about 0.960 g/cc.
12. The PE composition of any of paragraphs 1 to 11, wherein the first PE has a melt index ranging from about 0.05 to about 0.70 g/10 minutes.
13. The PE composition of any of paragraphs 1 to 12, wherein the first PE has a melt index ranging from about 0.05 to about 0.5 g/10 minutes.
14. The PE composition of any of paragraphs 1 to 13, wherein the first PE has a melt index less than about 0.30 g/10 minutes.
15. The PE composition of any of paragraphs 1 to 14, wherein the first PE has a molecular weight distribution ranging from about 5 to about 40.
16. The PE composition of any of paragraphs 1 to 15, wherein the first PE has a molecular weight distribution ranging from about 10 to about 40.
17. The PE composition of any of paragraphs 1 to 16, wherein the first PE has a molecular weight distribution ranging from about 15 to about 30.
18. The PE composition of any of paragraphs 1 to 17, wherein the first PE is a C-PE.
19. The PE composition of any of paragraphs 1 to 18, wherein the second PE has a density ranging from about 0.900 to about 0.940 g/cc.

20. The PE composition of any of paragraphs 1 to 19, wherein the second PE has a density ranging from about 0.916 to about 0.940 g/cc.
21. The PE composition of any of paragraphs 1 to 19, wherein the second PE has a density ranging from about 0.900 to about 0.935 g/cc.
22. The PE composition of any of paragraphs 1 to 21, wherein the second PE has a density ranging from about 0.900 to about 0.930 g/cc.
23. The PE composition of any of paragraphs 1 to 22, wherein the second PE has a molecular weight distribution ranging from about 2 to about 5.
24. The PE composition of any of paragraphs 1 to 23, wherein the second PE has a molecular weight distribution ranging from about 2 to about 4.
25. The PE composition of any of paragraphs 1 to 24, wherein the second PE has a molecular weight distribution ranging from about 2 to about 3.
26. The PE composition of any of paragraphs 1 to 25, wherein the second PE has a weight average molecular weight less than about 375,000.
27. The PE composition of any of paragraphs 1 to 26, wherein the second PE has a weight average molecular weight less than about 350,000.
28. The PE composition of any of paragraphs 1 to 27, wherein the second PE has a weight average molecular weight ranging from about 100,000 to about 300,000.
29. The PE composition of any of paragraphs 1 to 28, wherein the second PE has a high load melt index from about 0.1 to about 10 g/10 minutes.
30. The PE composition of any of paragraphs 1 to 29, wherein the second PE has a high load melt index from about 0.5 to about 7 g/10 minutes.
31. The PE composition of any of paragraphs 1 to 30, wherein the second PE has a high load melt index from about 1 to about 5.5 g/10 minutes.
32. The PE composition of any of paragraphs 1 to 31, wherein the second PE is a LLDPE.
33. The PE composition of any of paragraphs 1 to 32, wherein the second PE is a SS-PE.
34. The PE composition of any of paragraphs 1 to 33, wherein the second PE is a M-PE.
35. The PE composition of any of paragraphs 1 to 34, wherein the measured ESCR value for the PE composition is $\geq X(0.0271)(D^{(-147.58)})$, and wherein $X \geq 2$, and D is the density of the PE composition.
36. The PE composition of paragraph 35, wherein $X \geq 3$.
37. The PE composition of paragraph 36, wherein $X \geq 4$.
38. The PE composition of any of paragraphs 1 to 37, wherein the PE composition has a density ranging from about 0.945 to about 0.960 g/cc.
39. The PE composition of any of paragraphs 1 to 38, wherein the PE composition has a density ranging from about 0.948 to about 0.957 g/cc.
40. The PE composition of any of paragraphs 1 to 38, wherein the PE composition has a density ranging from about 0.950 to about 0.960 g/cc.
41. The PE composition of any of paragraphs 1 to 40, wherein the PE composition has a density ranging from about 0.955 to about 0.960 g/cc.
42. The PE composition of any of paragraphs 1 to 41, wherein the PE composition has a notched Izod Impact at least about 35% greater than the first PE of the PE composition.
43. The PE composition of any of paragraphs 1 to 42, wherein the PE composition has a notched Izod Impact ranging from about 35% to about 400% greater than the first PE of the PE composition.
44. The PE composition of any of paragraphs 1 to 43, wherein the PE composition has a notched Izod Impact ranging from about 35% to about 200% greater than the first PE of the PE composition.
45. The PE composition of any of paragraphs 1 to 43, wherein the PE composition has a notched Izod Impact ranging from about 50% to about 400% greater than the first PE of the PE blend.
46. The PE composition of any of paragraphs 1 to 45, wherein the PE blend has a notched Izod Impact ranging from about 50% to about 200% greater than the first PE of the PE blend.
47. The PE composition of any of paragraphs 1 to 46, wherein the PE composition has a high load melt index from about 5 to about 50 g/10 minutes.
48. The PE composition of any of paragraphs 1 to 47, wherein the PE composition has a high load melt index from about 10 to about 40 g/10 minutes.
49. The PE composition of any of paragraphs 1 to 48, wherein the PE composition has a high load melt index from about 15 to about 30 g/10 minutes.
50. The PE composition of any of paragraphs 1 to 49, wherein the PE composition has a high load melt index within about 7 g/10 minutes of the high load melt index of the first PE.
51. The PE composition of any of paragraphs 1 to 50, wherein the PE composition has a high load melt index within about 5 g/10 minutes of the high load melt index of the first PE.
52. The PE composition of any of paragraphs 1 to 51, wherein the PE composition has a high load melt index within about 3 g/10 minutes of the high load melt index of the first PE.
53. A pseudo-BOCD polyethylene composition comprising:
    (a) a first PE having a MWD greater than about 5 and a first comonomer;
    (b) a second PE having a MWD from about 1 to about 5 and a second comonomer; and
    (c) an $M_z$, wherein below the $M_z$ of the composition, the second PE has a higher mole % of the second comonomer than the first PE has of the first comonomer,
    wherein the polyethylene composition comprises at least about 90% of the first PE above the $M_z$ of the composition.
54. A pseudo-BOCD polyethylene composition comprising:
    (a) about 80 to about 95 weight % of a first PE, wherein the first PE has a MWD greater than 5 and a density greater than or equal to 0.945 g/cc; and
    (b) about 5 to about 20 weight % of a second PE, wherein the second PE has a MWD ranging from about 1 to about 5, a density less than about 0.945 g/cc, and a melt index less than about 0.70 g/10 minutes, wherein the melt index of the second PE is less than or equal to the melt index of the first PE,
    wherein the polyethylene composition comprises at least about 90% of the first PE above the $M_z$ of the composition.
55. The pseudo-BOCD polyethylene composition of paragraph 53 or 54, wherein the polyethylene composition comprises at least about 92% of the first PE above the $M_z$ of the composition.
56. The pseudo-BOCD polyethylene composition of paragraph 53 or 54, wherein the polyethylene composition comprises at least about 95% of the first PE above the $M_z$ of the composition.
57. The pseudo-BOCD polyethylene composition of paragraph 55 or 56, wherein the polyethylene composition comprises at least about 97% of the first PE above the $M_z$ of the composition.

58. The pseudo-BOCD polyethylene composition of paragarph 56, wherein the polyethylene composition comprises at least about 98% of the first PE above the $M_z$ of the composition.
59. A blow-molded article having a PE composition, the PE composition comprising:
   (a) from about 80 to about 95 weight % of a first PE having a density greater than or equal to 0.945 g/cc and a MWD greater than about 5; and
   (b) from about 5 to about 20 weight % of a second PE, having:
      (i) a density less than about 0.945 g/cc,
      (ii) a melt index less than about 0.70 g/10 minutes and less than or equal to the melt index of the first PE,
      (iii) a MWD ranging from about 1 to about 5, and
      (iv) a weight average molecular weight less than about 400,000;
   wherein the PE composition has an ESCR greater than the ESCR of the first PE.
60. A method of making a PE composition, the method comprising blending:
   (a) from about 80 to about 95 weight % of a first PE having a density greater than or equal to 0.945 g/cc and a MWD greater than about 5; and
   (b) from about 5 to about 20 weight % of a second PE, having:
      (i) a density less than 0.945 g/cc,
      (ii) a melt index less than about about 0.70 g/10 minutes and less than or equal to the melt index of the first PE,
      (iii) a MWD ranging from about 1 to about 5, and
      (iv) a weight average molecular weight less than about 400,000;
   wherein the PE composition has an ESCR greater than the ESCR of the first PE.

EXAMPLES

MI and HLMI ($I_{21}$) were measured according to ASTM D-1238 at 190° C. under a load of 2.16 kg and 21.6 kg, respectively. The units for MI and $I_{21}$ are g/10 min, or the equivalent dg/min.

Density was calculated according to ASTM D-1505-03. The density samples were prepared according to ASTM D-4703-03.

Notched Izod Impact was measured according to ASTM D-256.

ESCR was measured according to ASTM D-1693, Condition B, using 100% Igepal CO-630.

The chromium resins used in the chromium/metallocene blends were: High density polyethylene grades produced by ExxonMobil Chemical Company and previously available under the Trade names (1) HYA-301™ ("Chromium 1"), (2) EA60-003™ ("Chromium 2"), and (3) AL55-003™ ("Chromium 3"). Chromium 1 was obtained from ExxonMobil Chemical Company in Beaumont, Tex. Chromium 2 and Chromium 3 were obtained from ExxonMobil Chemical Company in Baton Rouge, La. The catalyst used to synthesize the metallocene component was (tetramethylcyclopentadienyl) (propyl-cyclopentadienyl) zirconium dichloride (hereinafter denoted "Met"). Met was activated using methyl alumoxane supported on D-948, a silica gel available from W.R. Grace & Co-Conn. (Colombia, Md.). The metallocene component comprised 0.35 wt % zirconium and 12 wt % aluminum. The reactor conditions were adjusted to achieve the desired melt indices (MI) and densities.

Metallocene 1 and Metallocene 2 were polymerized in a slurry within a one liter stirred and jacketed autoclave as follows: Hexane, hexene, and ethylene were purified over 2A sieves. 500 milliliters of hexane was introduced into the reactor followed by 0.5 microliters of tri-isobutylaluminum and 30 milliliters of hexene. The reactor was heated to 85° C. and 180 psi. Then ethylene was added to the reactor bringing the total pressure to about 221 psi. 30 milligrams of Met was added by a catalyst tube with small amounts (about 5 to 10 psi) of high pressure nitrogen. The ethylene source was constant throughout the polymerization, and less than about 10% of the comonomer was consumed. The polymerization was run for 30 minutes, and then the reactor was cooled and vented. The slurry contents were transferred into a suitable container for removal of volatiles. For Metallocene 1 a total of 51 grams of ethylene-hexene copolymer was obtained. For Metallocene 2 a total of 45 grams of granular ethylene-hexene copolymer was obtained.

Metallocene 3, Metallocene 4, and Metallocene 5 were polymerized in a slurry within a two-liter zipperclave reactor as follows: Isobutane was purified by through 13X molecular sieves, Selexsorb CD alumina, Selexsorb COS alumina, and Oxiclear columns. Ethylene was purified through 3A molecular sieves, Selexsorb CD alumina, Selexsorb COS alumina, and Oxiclear columns. The reactor was first purged under a nitrogen flow for 2 hours at 120-140° C. The following was introduced into the reactor: 0.5 mL of 1.0 M $AlEt_3$ solution in hexane, 120 mL of 1-hexene, and 850 mL of isobutane. The mixture was initiated by stirring, and the reactor was heated to 40-65° C. (as indicated below). The reactor was pressurized with ethylene to a total pressure of 275-300 psig, and 100 mg of catalyst was charged to the reactor by addition of the remaining 150 mL of isobutane. During polymerization, the reactor temperature was controlled via thermocouples in the reactor and the external jacket. Ethylene was fed on demand to maintain the desired total pressure. The polymerization was run for 45 min, and then the reactor was cooled and vented. For Metallocene 3 the reactor temperature was 65° C., the total reactor pressure was 300 psig. The density, melt index, $I_{21}$, and yield of Metallocene 3 was: 0.918 g/cc, 0.263 g/10 min, 4.74 g/10 min, and 116.3 grams, respectively. For Metallocene 4 the reactor temperature was 40° C., the total reactor pressure was 275 psig. The density, melt index, $I_{21}$, and yield of Metallocene 4 was: 0.921 g/cc, 0.161 g/10 min, 2.79 g/10 min, and 40.9 grams, respectively. For Metallocene 5 the reactor temperature was 50° C., the total reactor pressure was 275 psig. The density, melt index, $I_{21}$, and yield of Metallocene 5 was: 0.919 g/cc, 0.193 g/10 min, 3.48 g/10 min, and 63.6 grams, respectively.

The reactor Table 1 lists the individual components and their properties.

TABLE 1

| Sample Designation | Sample History | Density (g/cc) | Melt Index (g/10 min) | $I_{21}$ (g/10 min) |
|---|---|---|---|---|
| Chromium 1 | Gas phase chromium sample | 0.953 | 0.34 | 39.9 |
| Chromium 2 | Slurry loop chromium sample | 0.960 | 0.37 | 33.6 |
| Chromium 3 | Slurry loop chromium sample | 0.954 | 0.27 | 28.53 |
| Metallocene 1 | Met Batch Slurry | 0.930 | 0.14 | |
| Metallocene 2 | Met Batch Slurry | 0.932 | 0.06 | 1.17 |
| Metallocene 3 | Met Batch Slurry | 0.918 | 0.263 | 4.74 |
| Metallocene 4 | Met Batch Slurry | 0.921 | 0.161 | |
| Metallocene 5 | Met Batch Slurry | 0.919 | 0.193 | |

The blended samples were compression molded according to ASTM D-4703 Annex A1, Procedure C. More specifically, the blended compositions were blended by mixing the polymers in a heated C. W. Brabender Instruments Plasticorder to achieve a homogeneous melt at the desired composition. The Brabender was equipped with a Prep-Mixer head (approximately 200 cm$^3$ volume) and roller blades. The operating temperature was about 190° C. The two components were melted and mixed for about 5 minutes at 60 RPM under a nitrogen purge. The Brabender was opened and the melt was removed from the mixing head and blades as quickly as possible, and allowed to solidify. The blends later were cut into smaller pieces using a guillotine, then ground into even smaller pieces using a Wiley Mill. Specimens used to calculate density, notched Izod Impact, and ESCR were cut from the resulting plaques.

TABLE 2

| Blend # | Chromium Component | Metallocene Component | Chromium-to-Metallocene | Density g/cc | ESCR (hours) | Notched Izod Impact* (ft lbs/in) |
|---|---|---|---|---|---|---|
| 1 | Chromium 1 | Metallocene 1 | 90/10 | 0.950 | 366 | 2.587 (P) |
| 2 | Chromium 2 | Metallocene 1 | 90/10 | 0.957 | 48 | 6.006 (NB) |
| 3 | Chromium 2 | Metallocene 2 | 90/10 | 0.957 | 38 | 7.006 (NB) |
| 4 | Chromium 2 | Metallocene 3 | 90/10 | 0.956 | 54 | 8.186 (NB) |
| 5 | Chromium 1 | Metallocene 3 | 90/10 | 0.949 | 735 | 2.929 (P) |
| 6 | Chromium 1 | Metallocene 2 | 90/10 | 0.951 | 332 | 6.636 (P) |
| 7 | Chromium 1 | Metallocene 4 | 90/10 | 0.949 | 539 | 3.266 (NB) |
| 8 | Chromium 2 | Metallocene 5 | 90/10 | 0.956 | 42 | 7.753 (NB) |
| 9 | Chromium 2 | Metallocene 2 | 80/20 | 0.955 | 172 | 10.364 (NB) |
| 10 | Chromium 3 | Metallocene 1 | 90/10 | 0.952 | 202 | 3.659 (P) |
| 11 | Chromium 3 | Metallocene 2 | 90/10 | 0.953 | 120 | 3.707 (P) |
| 12 | Chromium 3 | Metallocene 3 | 90/10 | 0.950 | 320 | 4.152 (P) |

*(P) means partial breaks and (NB) means no breaks.

TABLE 3

| Chromium Control | Density | ESCR (hours) | Notched Izod Impact (ft lbs/in) |
|---|---|---|---|
| HYA-301 | 0.953 | 49/55 | 1.724 (P) |
| EA60-003 | 0.960 | 12 | 3.258 (P) |
| AD60-005 | 0.963 | 6 | |
| AL55-003 (control) | 0.954 | 19/31 | 2.136 (P), 2.714 (P) |
| AB50-003 (control) | 0.950 | 50/48 | 2.136 (P) |
| EA50-003 | 0.950 | 37 | |

Table 3 shows ESCR for chromium samples. AB50-003 and AL55-003 are HDPE control resins (previously available from ExxonMobil Chemical Company).

All documents described are fully incorporated herein by reference, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law.

What is claimed is:

1. A polyethylene (PE) composition comprising:
    (a) from about 90 to about 95 weight % (based upon the weight of the blend) of a first chromium-catalyzed PE having a density greater than or equal to 0.945 g/cc, a melt index ranging from about 0.05 to about 0.70 g/10 minutes, and a MWD ranging from about 30 to about 40; and
    (b) from about 5 to about 10 weight % (based upon the weight of the blend) of a second PE, having:
        (i) a density ranging from about 0.916 to about 0.940 g/cc;
        (ii) a melt index less than about 0.40 g/10 minutes and a high load melt index from about 0.1 to about 10 g/10 minutes; wherein the melt index of the second PE is less than or equal to the melt index of the first PE;
        (iii) a MWD ranging from about 1 to about 5,
        (iv) a CDBI greater than about 50%; and
        (v) a weight average molecular weight ranging from about 100,000 to about 300,000;
    wherein the PE composition has an ESCR greater than the ESCR of the first PE.

2. The PE composition of claim 1, wherein the first PE is a co-polymer.

3. The PE composition of claim 1, wherein the density of the PE composition is within about 0.008 g/cc of the density of the first PE.

4. The PE composition of claim 3, wherein the density of the PE composition is within about 0.005 g/cc of the density of the first PE.

5. The PE composition of claim 4, wherein the density of the PE composition is within about 0.003 g/cc of the density of the first PE.

6. The PE composition of claim 5, wherein the density of the PE composition is within about 0.002 g/cc of the density of the first PE.

7. The PE composition of claim 1, wherein the first PE has a density ranging from about 0.945 to about 0.970 g/cc.

8. The PE composition of claim 7, wherein the first PE has a density ranging from about 0.950 to about 0.965 g/cc.

9. The PE composition of claim 7, wherein the first PE has a density ranging from about 0.955 to about 0.960 g/cc.

10. The PE composition of claim 1, wherein the first PE has a melt index ranging from about 0.05 to about 0.5 g/10 minutes.

11. The PE composition of claim 1, wherein the first PE has a melt index less than about 0.30 g/10 minutes.

12. The PE composition of claim 1, wherein the second PE has a density ranging from about 0.916 to about 0.935 g/cc.

13. The PE composition of claim 12, wherein the second PE has a density ranging from about 0.916 to about 0.930 g/cc.

14. The PE composition of claim 1, wherein the second PE has a molecular weight distribution ranging from about 2 to about 5.

15. The PE composition of claim 12, wherein the second PE has a molecular weight distribution ranging from about 2 to about 4.

16. The PE composition of claim 12, wherein the second PE has a molecular weight distribution ranging from about 2 to about 3.

17. The PE composition of claim 1, wherein the second PE has a high load melt index from about 0.5 to about 7 g/10 minutes.

18. The PE composition of claim 17, wherein the second PE has a high load melt index from about 1 to about 5.5 g/10 minutes.

19. The PE composition of claim 1, wherein the second PE is a LLDPE.

20. The PE composition of claim 1, wherein the second PE is a SS-PE.

21. The PE composition of claim 1, wherein the second PE is a M-PE.

22. The PE composition of claim 1, wherein the measured ESCR value for the PE composition is $\geq X(0.0271)^{(D(-147.58))}$, and wherein $X \geq 2$, and D is the density of the PE composition.

23. The PE composition of claim 22, wherein $X \geq 3$.

24. The PE composition of claim 23, wherein $X \geq 4$.

25. The PE composition of claim 1, wherein the PE composition has a density ranging from about 0.945 to about 0.960 g/cc.

26. The PE composition of claim 25, wherein the PE composition has a density ranging from about 0.948 to about 0.957 g/cc.

27. The PE composition of claim 25, wherein the PE composition has a density ranging from about 0.950 to about 0.960 g/cc.

28. The PE composition of claim 27, wherein the PE composition has a density ranging from about 0.955 to about 0.960 g/cc.

29. The PE composition of claim 1, wherein the PE composition has a notched Izod Impact at least about 35% greater than the first PE of the PE composition.

30. The PE composition of claim 29, wherein the PE composition has a notched Izod Impact ranging from about 35% to about 400% greater than the first PE of the PE composition.

31. The PE composition of claim 30, wherein the PE composition has a notched Izod Impact ranging from about 35% to about 200% greater than the first PE of the PE composition.

32. The PE composition of claim 30, wherein the PE composition has a notched Izod Impact ranging from about 50% to about 400% greater than the first PE of the PE blend.

33. The PE composition of claim 32, wherein the PE blend has a notched Izod Impact ranging from about 50% to about 200% greater than the first PE of the PE blend.

34. The PE composition of claim 1, wherein the PE composition has a high load melt index from about 5 to about 50 g/10 minutes.

35. The PE composition of claim 34, wherein the PE composition has a high load melt index from about 10 to about 40 g/10 minutes.

36. The PE composition of claim 35, wherein the PE composition has a high load melt index from about 15 to about 30 g/10 minutes.

37. The PE composition of claim 1, wherein the PE composition has a high load melt index within about 7 g/10 minutes of the high load melt index of the first PE.

38. The PE composition of claim 37, wherein the PE composition has a high load melt index within about 5 g/10 minutes of the high load melt index of the first PE.

39. The PE composition of claim 38, wherein the PE composition has a high load melt index within about 3 g/10 minutes of the high load melt index of the first PE.

40. A pseudo-BOCD polyethylene composition comprising:
    (a) about 90 to about 95 weight % of a first chromium-catalyzed PE, wherein the first PE has a MWD ranging from about 30 to about 40, a melt index ranging from about 0.05 to about 0.70 g/10 minutes, and a density greater than or equal to 0.945 g/cc; and
    (b) about 5 to about 10 weight % of a second PE, wherein the second PE has a MWD ranging from about 1 to about 5, a density less than about 0.945 g/cc, and a melt index less than about 0.70 g/10 minutes and less than or equal to the melt index of the first PE, a high load melt index from about 0.1 to about 10 g/10 minutes and a weight average molecular weight ranging from about 100,000 to about 300,000,
    wherein the polyethylene composition comprises at least about 90% of the first PE above the Mz of the composition.

41. The pseudo-BOCD polyethylene composition of claim 40, wherein the polyethylene composition comprises at least about 92% of the first PE above the Mz of the composition.

42. The pseudo-BOCD polyethylene composition of claim 40, wherein the polyethylene composition comprises at least about 95% of the first PE above the Mz of the composition.

43. The pseudo-BOCD polyethylene composition of claim 40, wherein the polyethylene composition comprises at least about 97% of the first PE above the Mz of the composition.

44. The pseudo-BOCD polyethylene composition of claim 40, wherein the polyethylene composition comprises at least about 98% of the first PE above the Mz of the composition.

45. A blow-molded article having a PE composition, the PE composition comprising:
    (a) about 90 to about 95 weight % of a first chromium-catalyzed PE having a density greater than or equal to 0.945 g/cc a melt index ranging from about 0.05 to about 0.07 g/10 minutes, and a MWD ranging from about 30 to about 40; and
    (b) from about 5 to about 10 weight % of a second PE having;
        (i) a density ranging from about 0.916 to about 0.945 g/cc,
        (ii) a melt index less than about 0.40 g/10 minutes and less than or equal to the melt index of the first PE and a high load melt index from about 0.1 to about 10 g/10 minutes,
        (iii) a MWD ranging from about 1 to about 5, and
        (iv) a weight average molecular weight ranging from about 100,000 to about 300,000,
    wherein the PE composition has an ESCR greater than the ESCR of the first PE.

46. A method of making a PE composition, the method comprising blending:
    (a) from about 90 to about 95 weight % of a first chromium-catalyzed PE having a density greater than or equal to 0.945 g/cc a melt index ranging from about 0.05 to about 0.07 g/10 minutes, and a MWD ranging from about 30 to about 40; and
    (b) from about 5 to about 10 weight % of a second PE having;
        (i) a density ranging from about 0.916 to about 0.945 g/cc,
        (ii) a melt index less than about 0.40 g/10 minutes and less than or equal to the melt index of the first PE and a high load melt index from about 0.1 to about 10 g/10 minutes,
        (iii) a MWD ranging from about 1 to about 5, and
        (iv) a weight average molecular weight ranging from about 100,000 to about 300,000,
    wherein the PE composition has an ESCR greater than the ESCR of the first PE.

* * * * *